P. G. Claney,
Sheep Shears.

No. 80,914.        Patented Aug. 11, 1868.

Witnesses:
J. Alfred Ellis
J. V. White

Inventor:
P. G. Claney
per J. H. Alexander,
Atty.

UNITED STATES PATENT OFFICE.

PATRICK G. CLANEY, OF AUGUSTA, MAINE.

IMPROVEMENT IN SHEEP-SHEARS.

Specification forming part of Letters Patent No. 80,914, dated August 11, 1868.

*To all whom it may concern:*

Be it known that I, PATRICK G. CLANEY, of Augusta, in the county of Kennebec and State of Maine, have invented certain new and useful Improvements in Sheep-Shears; and I do hereby declare that the following is a full, clear, and exact description thereof, reference being had to the accompanying drawings, and to the letters of reference marked thereon, which form a part of this specification, in which—

Figure 1:
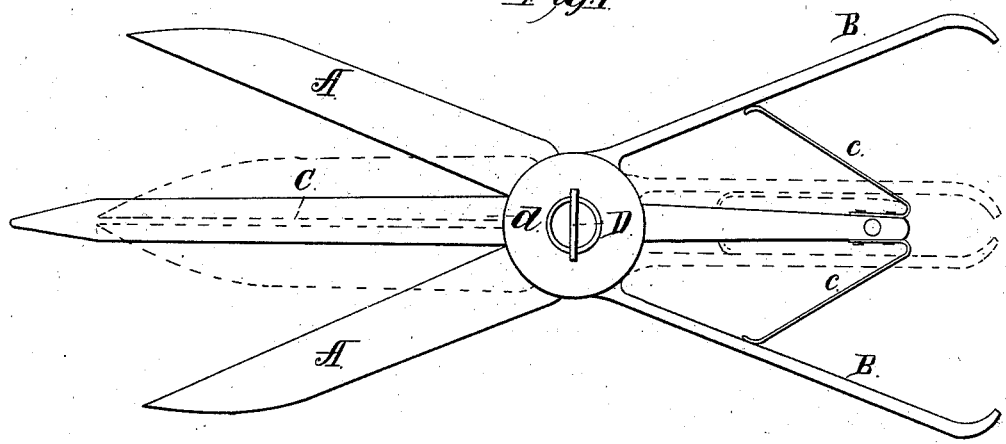
Figure 2:
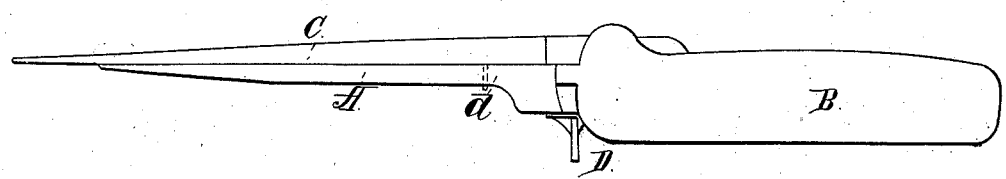

Figure 1 represents a plan view of my sheep-shears when open, and Fig. 2 is a side view of the same.

The nature of my invention consists in the employment of a straight two-edged cutting-blade, arranged in combination with the blades of a pair of sheep-shears, substantially in the manner as will be hereinafter described.

To enable others skilled in the art to make and employ my invention, I will now describe its construction and operation.

In the accompanying drawings, A A represent the blades of an ordinary pair of sheep-shears, which are formed, at the point where they are pivoted together, with circular plates, as seen in Fig. 1. On these plates, and diagonally across from the blades A A, are formed the handles or shanks B B, which are made with projections at their inner ends, as shown in Fig. 2. Beyond these projections the handles are gradually curved inward, so as to prevent the hand from being pinched while shearing.

C designates another blade, which is provided with straight cutting-edges, as shown in Fig. 1, which I wish to be particularly observed. The under side of this blade is beveled off to a point, in order to prevent the skin from being cut while the wool is being sheared, the point being rounded and reduced, so that it will easily penetrate the wool. The inner end or portion of this blade is curved upward, it being situated on the under-side center of the blades A A, so that it will be in a line with the handles or shanks of A A, and is provided on each side therein with a spring, $c$, bent so that its opposite ends will press against the inner sides of the handles B B and force the blades A A open, thus enabling the shears to be easily operated.

D represents a thumb-screw, passing through and securing the blades in position at the point where they unite, and by means of the thumb-screw D the blades can also be taken apart when they need cleaning or sharpening. $d$ is a projection or guard, situated between the blades A A, and entering the blade C near or at the point where said blade is pivoted. The object of this guard is to keep the blades A A from coming in contact with each other, in order to obviate their being dulled in that way.

I am aware of the existence of shears having a center blade with its cutting edges or sides inclined. I do not therefore lay claim to this feature; but,

Having thus described my invention, what I claim as new, and desire to secure by Letters Patent, is—

The employment of the center blade C, constructed with parallel cutting-edges, substantially as and for the purpose set forth.

In testimony that I claim the foregoing as my own I affix my signature in presence of two witnesses.

PATRICK G. CLANEY.

Witnesses:
W. H. COWENHOVER,
WM. MEYERS.